A. M. AHERN.
ANIMAL TRAP.
APPLICATION FILED MAY 15, 1915.
1,174,534.
Patented Mar. 7, 1916.
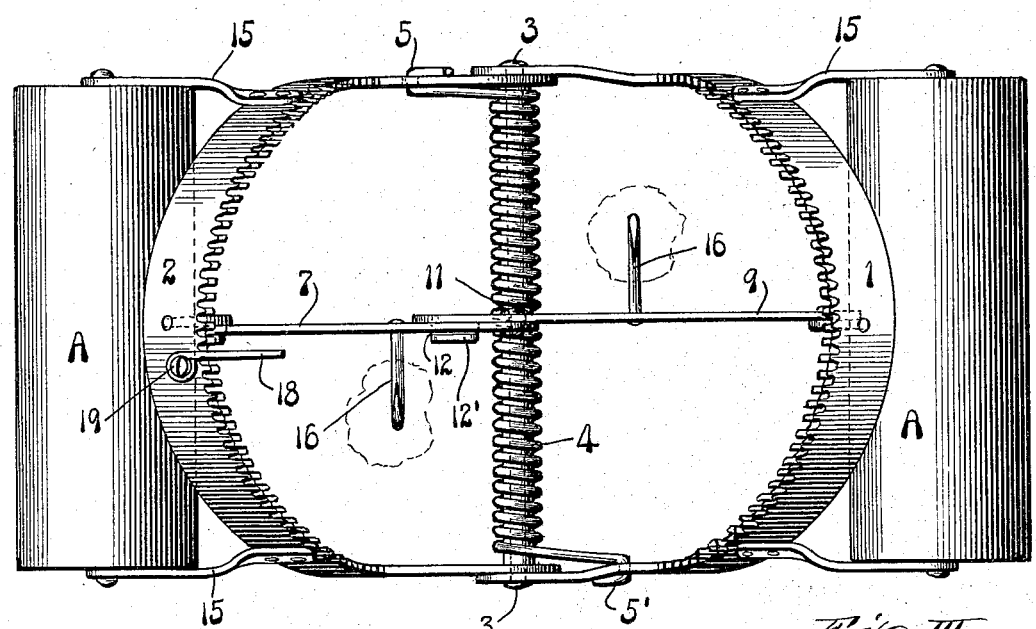
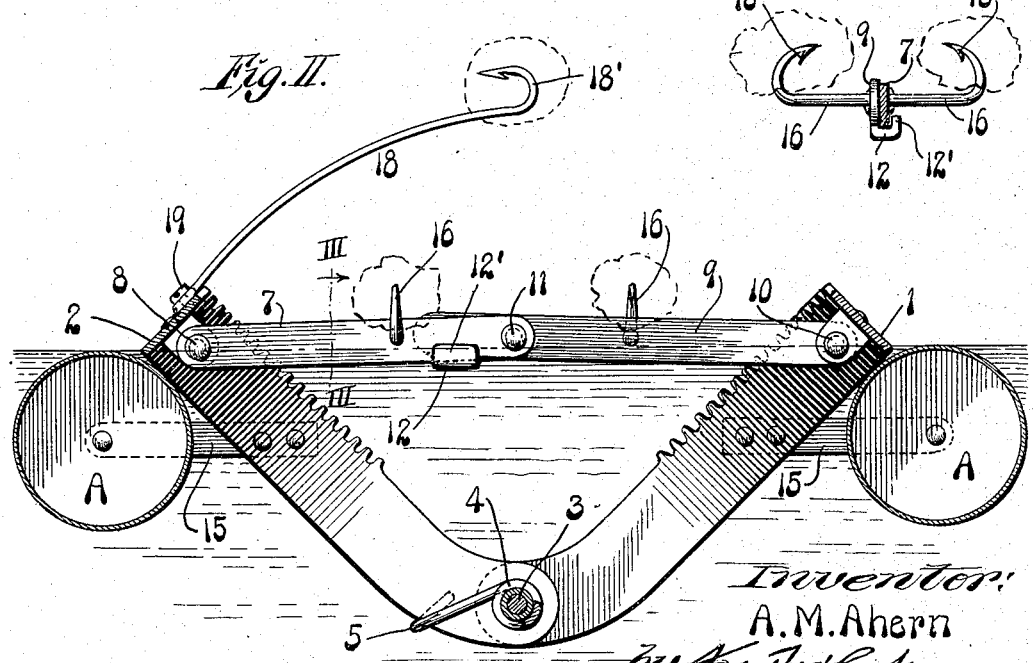
Inventor:
A. M. Ahern

UNITED STATES PATENT OFFICE.

ALBERT M. AHERN, OF ST. LOUIS, MISSOURI.

ANIMAL-TRAP.

1,174,534.

Specification of Letters Patent.

Patented Mar. 7, 1916.

Application filed May 15, 1915. Serial No. 28,302.

*To all whom it may concern:*

Be it known that I, ALBERT M. AHERN, a citizen of the United States of America, a resident of the city of St. Louis, State of Missouri, have invented certain new and useful Improvements in Animal-Traps, of which the following is a full, clear, and exact description, reference being had to the accompanying drawings, forming a part of this specification.

My invention relates to improvements in traps, one of the objects being to produce an animal trap provided with a float by which the trap structures may be supported in a body of water.

The trap preferably comprises a metallic gripping device, including a pair of jaws, and float members secured to said jaws.

Another object is to produce an improved bait holding device, particularly adapted for use on a floating trap.

With the foregoing and other objects in view the invention consists of the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

Figure I is a top or plan view of a trap embodying the features of my invention. Fig. II is a vertical section taken approximately through the center of the trap. Fig. III is a section taken approximately on the line III—III, Fig. II.

The trap I have shown to illustrate the preferred form of my invention comprises a pair of inverted U-shaped gripping jaws 1 and 2, a pivot rod 3 connecting the lower ends of said jaws, and a spring 4 for closing said jaws. The spring 4 surrounds the pivot rod 3, one end of said spring being bent to form a hook 5 which passes around the lower edge of jaw 2, and the opposite end of said spring being in the form of a hook 5' fitted to the jaw 1. This spring is under tension and it tends to force the jaws toward each other.

The tripping device for holding the jaws away from each other is preferably a toggle consisting of a link 7 pivoted at 8 to the jaw 2, and a link 9 pivoted at 10 to the jaw 1. These toggle links 7 and 9 lap each other near the middle of the trap and they are pivotally connected together at 11.

12 designates a stop member extending from the link 9 and adapted to engage the lower edge of link 7 to limit the upward movement of the toggle. The stop member 12 is preferably bent upwardly at 12' to serve as means for preventing the toggle links from moving laterally, thereby reinforcing the toggle at a point near the pivot pin 11. When the parts occupy the position shown in the drawings, the center of the pivot 11 is in a plane above the pivots 8 and 10, and the spring 4 tends to move the pivot 11 upwardly, such movement being prevented by the stop member 12 which engages the toggle link 7. When the toggle is depressed, the jaws are thrown toward each other by the spring 4.

The trap is preferably made entirely of metal, and it is adapted to be supported in a body of water by means of a float which preferably includes a pair of float members A secured to the gripping jaws. The float members are preferably air tight metallic cylinders closed at their ends and arranged in planes below the upper edges of the trap. The gripping jaws are arranged between the float members and secured thereto by arms 15 which connect the side members of the gripping jaws to the ends of the cylinders.

16 designates bait hooks arranged on opposite sides of the toggle in such a manner that they will not in any way interfere with the movement of said toggle. One of the bait hooks 16 is secured to the toggle link 7, the other being secured to the link 9. These bait hooks are adapted to hold the bait above the body of water, as shown by dotted lines in Fig. II, where it will be exposed to the view of the animal. The bait receiving end of each bait hook is preferably provided with a barb 16' for retaining the bait on the hook. When one of the bait hooks 16 is forced downwardly, a corresponding movement is imparted to the toggle, thereby breaking the toggle and permitting the spring 4 to force the gripping jaws toward each other.

18 designates a bait support, preferably a wire, detachably secured to the jaw 2 by means of a screw 19, and provided with a bait holder 18' at its outer end. This bait support 18 extends upwardly and away from the jaw 2, and it is located entirely beyond the path of movement of the jaws. The bait holder 18′ preferably lies in a plane above the middle portion of the toggle.

I claim:

1. An animal trap comprising a pair of inverted U-shaped gripping jaws pivotally connected together at their lower ends, a spring tending to close said jaws, a tripping device for holding said jaws in their open position, all of said parts being made of metal, and a float secured to said gripping jaws, said float being adapted to support all of said parts in a body of water.

2. An animal trap comprising a pair of inverted U-shaped gripping jaws, pivotally connected together at their lower ends, a spring tending to close said jaws, a tripping device for holding said jaws in their open position, all of said parts being made of metal, and a float secured to said gripping jaws, said float being adapted to support all of said parts in a body of water, and a bait support adapted to hold bait above the body of water.

ALBERT M. AHERN.

Copies of this patent may be obtained for five cents each, by addressing the "Commissioner of Patents, Washington, D. C."